(No Model)
A. C. DINKEY.
TONGS OPERATING MECHANISM.
No. 547,913. Patented Oct. 15, 1895.
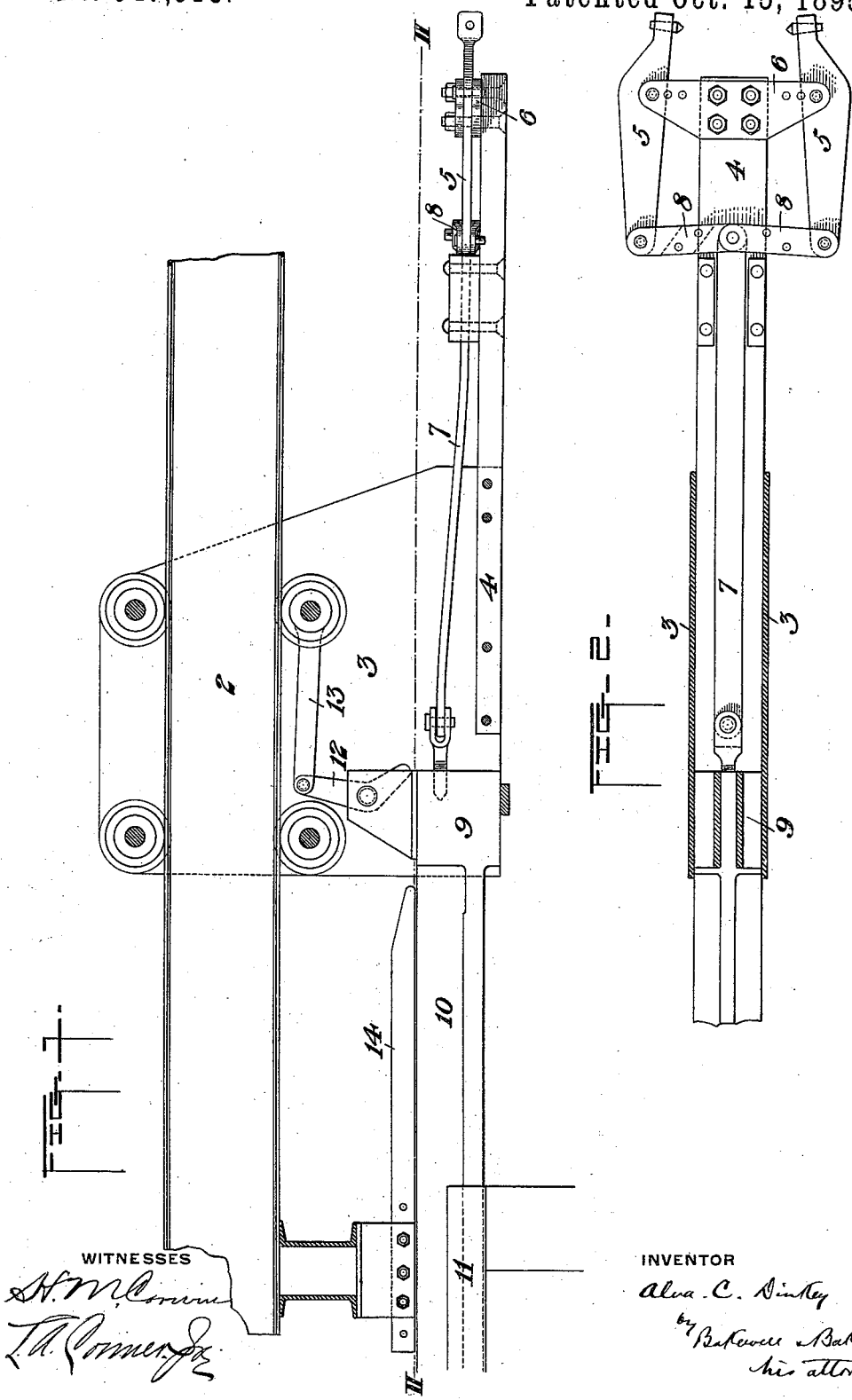

UNITED STATES PATENT OFFICE.

ALVA C. DINKEY, OF MUNHALL, PENNSYLVANIA.

TONGS-OPERATING MECHANISM.

SPECIFICATION forming part of Letters Patent No. 547,913, dated October 15, 1895.

Application filed July 31, 1895. Serial No. 557,713. (No model.)

*To all whom it may concern:*

Be it known that I, ALVA C. DINKEY, of Munhall, in the county of Allegheny and State of Pennsylvania, have invented a new and useful Improvement in Tongs-Operating Mechanism, of which the following is a full, clear, and exact description, reference being had to the accompanying drawings, forming part of this specification, in which—

Figure 1 is a side elevation of my improved apparatus, and Fig. 2 is a horizontal cross-section on the line II II of Fig. 1.

My invention relates to tongs-operating mechanism of the type set forth in my Patent No. 539,982, dated May 28, 1895, and is designed to afford means for opening the tongs at the desired point and enabling them to be moved back while held in open position.

In the drawings, in which similar numerals indicate corresponding parts, 2 represents a horizontal beam, which may be the jib of a rotary or traveling crane, or the jib or beam of a traveling buggy, or other carrier arranged to convey metal blooms or ingots. On this beam is mounted a trolley or carrier 3, which is arranged to move back and forth on wheels or slides and carries a frame or base 4, on which are mounted the jaws 5 of the tongs, these jaws being pivoted either directly to the frame or to a cross-head 6 thereon. To open and close the jaws I provide the rod 7, which is connected by toggle-levers 8 with the tong levers, and is pivotally secured to a sliding-head 9 upon the frame. This head is guided between the sides of the trolley or carrier and forms the end of a sliding bar 10 moving within guides 11 upon the car or crane, this bar 10 being reciprocated by any suitable means, such as a rack-bar or hydraulic cylinder.

The head 9 is slotted vertically, and in the slot is pivoted a bell-crank lever 12, the upper arm of which is pivotally connected by a link 13 with the shaft of one of the wheels upon which the trolley is carried, the other depending arm projecting into the slot. Supported below the beam 2 and in line with the slot of the head is a stop 14, having an upper inclined face at its end and arranged to engage the lower arm of the bell-crank lever and swing the same upon its pivot.

The operation is as follows: The bar 10 being moved forward, the inertia of the trolley is such that the head 9 moves forward and opens the tong-levers, after which the further movement of the bar moves forward the trolley and tongs, which are brought into proper position, within the furnace or elsewhere, to grasp the ingot. The bar 10 then being moved rearward, the inertia of the trolley causes the head 9 to move rearward and thus close the tongs, and after they grip the ingot the trolley moves back as a whole. In this rearward movement, when the head moves back over the stop 14, which enters the slot thereof and engages the bell-crank lever, it thereby swings the upper arm and moves the trolley and frame 4 back relatively to the head, thus opening the tongs and releasing the ingot, the jaws then being held open by the lever traveling upon and being supported by the stop as the trolley moves on. In the next forward movement of the bar 10 the head moves forward and raises the lower end of the bell-crank lever from the stop, it traveling forward clear thereof.

The advantages of my improvement result from the fact that the tongs automatically seize the piece of metal, carry it out, open and deposit it upon the car or upon rollers, and then while open move back clear thereof.

Many changes may be made in the form and arrangement of the parts without departure from my invention, since

What I claim is—

1. The combination of a movable carrier, tongs carried thereon, tongs-operating mechanism situate at a point off the carrier, and a fixed stop engaging a part of said mechanism, whereby the tongs are operated during the movement of the carrier; substantially as described.

2. The combination with a jib or beam, of a trolley movable thereon and carrying tongs, a head movable upon the trolley and connected to the tongs, and a fixed stop upon the jib or beam arranged to engage the tongs-operating mechanism, and open the tongs during the movement of the trolley; substantially as described.

3. The combination with a jib or beam, of a trolley movable thereon and carrying tongs, a head movable upon the trolley and connected to the tongs, a lever pivoted in the head and connected to the trolley, and a fixed stop arranged to engage the lever; substantially as described.

In testimony whereof I have hereunto set my hand.

ALVA C. DINKEY.

Witnesses.
G. I. HOLDSLIP,
H. M. CORWIN.